(12) United States Patent
Obaidi

(10) Patent No.: US 11,323,765 B1
(45) Date of Patent: May 3, 2022

(54) RECORDING MANAGER

(71) Applicant: T-Mobile USA, Inc., Bellevue, WA (US)

(72) Inventor: Ahmad Arash Obaidi, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/080,775

(22) Filed: Oct. 26, 2020

(51) Int. Cl.
*H04N 21/433* (2011.01)
*H04N 21/422* (2011.01)
*H04N 21/4227* (2011.01)

(52) U.S. Cl.
CPC ..... *H04N 21/4334* (2013.01); *H04N 21/4227* (2013.01); *H04N 21/42203* (2013.01); *H04N 21/42204* (2013.01)

(58) Field of Classification Search
CPC ......... H04N 21/4334; H04N 21/42203; H04N 21/42204; H04N 21/4227
See application file for complete search history.

(56) References Cited

U.S. PATENT DOCUMENTS

| | | | |
|---|---|---|---|
| 9,485,359 B2 | 11/2016 | Kumar et al. | |
| 10,506,091 B2 | 12/2019 | Tibbitts et al. | |
| 2016/0205556 A1 | 7/2016 | Borghei | |
| 2017/0070698 A1 | 3/2017 | Parmar et al. | |
| 2017/0228129 A1* | 8/2017 | Shen | G06F 3/0482 |
| 2020/0053099 A1 | 2/2020 | Day et al. | |
| 2021/0182440 A1* | 6/2021 | Singh | G06N 20/00 |

* cited by examiner

*Primary Examiner* — Mishawn N. Hunter
(74) *Attorney, Agent, or Firm* — Han Santos, PLLC

(57) ABSTRACT

Methods, systems, and apparatus, including computer programs encoded on a computer storage medium, for implementing a recording manager are disclosed. In one aspect, a method includes the actions of receiving, from a first computing device, a request to disable an audio, video, or image capture feature of one or more other computing devices in a particular location. The actions further include, based on receiving the request to disable the recording feature of the one or more other computing devices, identifying a second computing device in the particular location. The actions further include providing, for output to the second computing device in the particular location, an instruction to disable the audio, video, or image capture feature.

20 Claims, 9 Drawing Sheets

800

Receive, from a first computing device that is communicating with a second computing device, a request to disable a recording feature of the second computing device
810

Determine that the second computing device is configured to receive the request to disable the recording feature
820

Provide, for output to the second computing device, an instruction to disable the recording feature
830

FIG. 8

RECORDING MANAGER

BACKGROUND

Many computing devices are equipped with cameras and microphones. The cameras are able to detect still and moving images, and the microphones are able to detect audio. These computing devices may also include a processor and memory. The processor may be able to process the detected images and audio and store the data in the memory.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 8 is a flowchart of an example process for adjusting a recording function of a computing device during a voice call.

DETAILED DESCRIPTION

With the proliferation of mobile devices, such as phones, e-readers, portable gaming devices, smart watches, and tablets, users now have the ability to record audio and video at the touch of a finger. While this is beneficial in many situations, it can create security and privacy risks in others. For example, during a private meeting, a user may be able to activate the audio recording feature of the user's mobile phone. Other participants in the meeting may be unaware that the user activated the recording feature because the mobile phone may be in the user's pocket or sitting on a table or desk without the user interacting with the mobile phone during the meeting. With a recording of the private meeting stored on the mobile phone, the privacy of the meeting may be compromised. The user may inadvertently send the recording to another user. A nefarious actor may hack into the user's mobile phone and access the recording.

In order to decrease the likelihood of this type of security or privacy breach, a mobile phone can include an application that allows another user to disable the audio and/or video recording features. This application communicates with a server that manages the disabling of the recording features. During a private meeting, the server may receive a request to disable the recording features of mobile phones that are perceived to be located at the meeting site. The server identifies the mobile phones that have the recording management application installed and that are located at the meeting. The server transmits, to those mobile phones located at the meeting, an instruction to disable the recording features. When the meeting is over, the server receives a request to reenable the recording features of those mobile phones. The server transmits an instruction to reenable the recording features. If the user of a mobile phone leaves the meeting, then the application may activate the recording features automatically.

The recording management application may have additional functionality beyond private meetings. If two users are having a conversation over the phone, the recording management application may receive an instruction from one of the users to ensure that the call is secure. The server receives the request and disables the recording function of the other device. When the call is over, the recording management application reenables the recording features.

Figure 1:
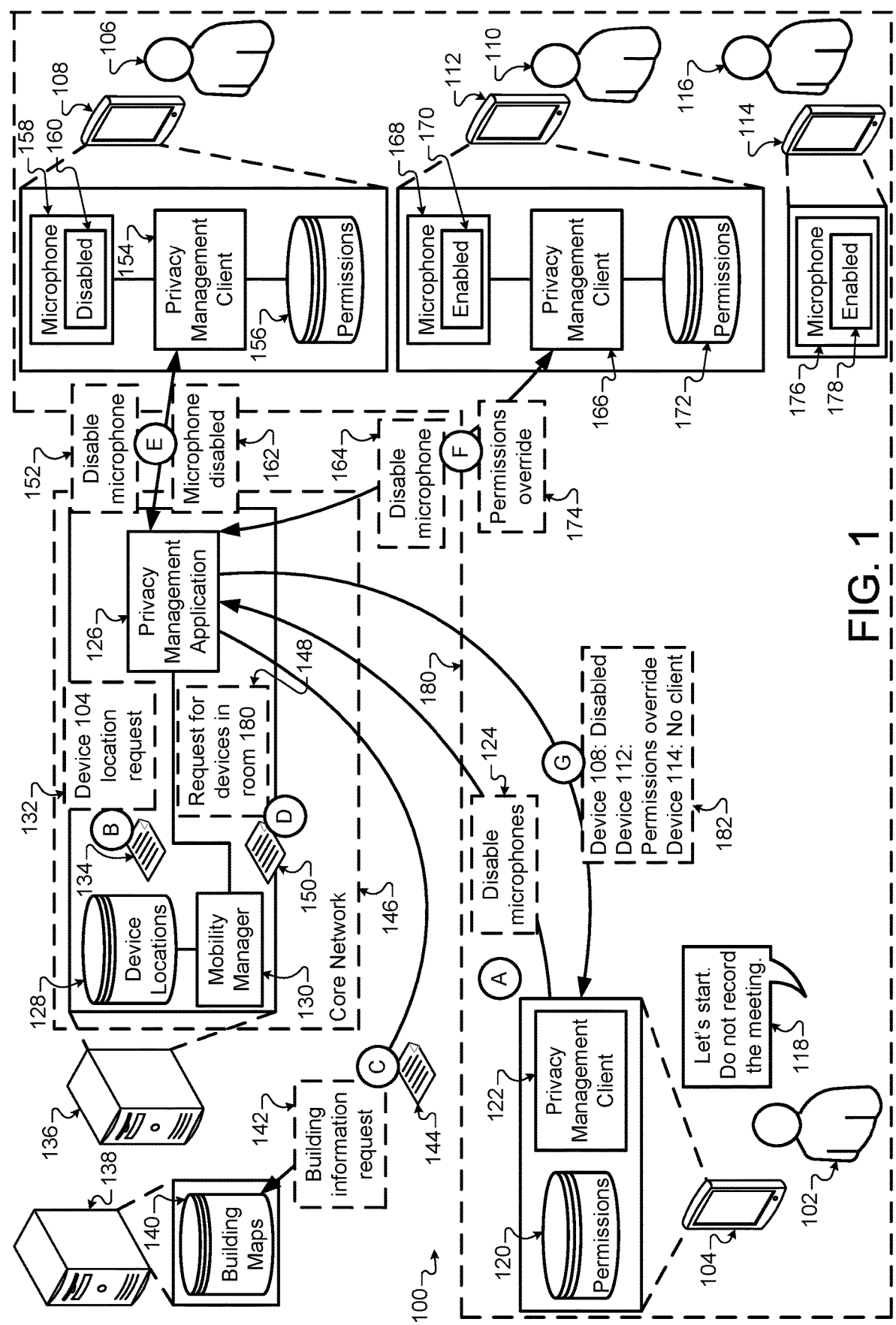
FIG. 1 illustrates an example system that is configured to adjust recording functions of computing devices.

FIG. 1 illustrates an example system 100 that is configured to adjust recording functions of computing devices 108, 112, and 114. Briefly, and as described in more detail below, the system 100 includes a server 136 that communicates with computing devices 104, 108, 112, and 114. The server 136 may be configured to receive and transmit instructions to disable a recording function of one or more of the computing devices 104, 108, 112, and 114. The server 136 may determine the locations of each of the computing devices 104, 108, 112, and 114 to determine whether to transmit an instruction to disable the recording function.

In more detail, the user 102 is prepared to start a meeting in room 180. During the meeting, the attendees, such as users 106, 110, and 116, of the meeting may be discussing confidential information that should not be recorded. To prevent the users 106, 110, and 116 from recording the meeting, the user 102 may use the computing device 104 to request that the server 136 provide instructions to the other computing devices in the room 180 to disable the recording functions of the computing devices during the meeting. The server 136 may receive the request and attempt to disable the recording functions of the computing devices 108, 112, and 114.

The users 102, 106, 110, and 116 may be employees of the same company. The company may manage the computing devices 104, 108, 112, and 114, which may include installing various applications and/or clients on the computing devices 104, 108, 112, and 114. The company may own the computing devices 104, 108, 112, and 114 and may pre-install various applications and/or clients. The employees may own the computing devices 104, 108, 112, and 114, and the company may require that certain applications and/or clients be installed on the computing devices 104, 108, 112, and 114 if the computing devices 104, 108, 112, and 114 are going to access computing resources of the company. One of these applications may be a privacy management client that allows each computing device 104, 108, 112, and 114 to output and receive instructions to disable a recording function of the computing device 104, 108, 112, and 114. The recording function may include an audio recording function, a video or image recording function, or any other similar recording function.

In stage A, the user 102 may be starting a meeting in room 180 and may speak the utterance 118, "Let's start. Do not record the meeting." In order to prevent users in the room 180 from recording the meeting, the user 102 may access the privacy management client 122 on the computing device 104. The privacy management client 122 may interface with the privacy management application 126 of the server 136. The user 102 may be able to provide requests to the privacy management client 122 regarding disabling the recording feature of other computing devices. For example, the user 102 may provide instructions to the privacy management client 122. The instructions may be to disable the microphones of other computing devices in the vicinity of the computing device 104. The privacy management client 122 may provide the request 124 to the server 136 that includes the instructions and additional information. The request 124 may include the instructions to disable the microphones of other computing devices in the vicinity of the computing device 104 and the permissions 120.

The request 124 may include instructions for when and where to disable the recording feature of other computing devices. The request 124 may indicate the time period to disable the recording feature. For example, the user 102 may indicate that the meeting will last for one hour. In this case, the user 102 may include, in the request 124 a one-hour period to disable the recording features. As another example, the user 102 may indicate that the meeting will last until a particular time. In this case, the user 102 may include, in the request 124, a 3:00 pm time to no longer disable the recording features. As another example, the user 102 may include a start time for the meeting. In this case, the user 102 may include, in the request 124, a 2:00 pm time to disable the recording features.

The request 124 may indicate the location to disable the recording feature. For example, the user 102 may indicate to disable the recording feature in the same room as the computing device 104. As another example, the user 102 may indicate to disable the recording features within a threshold distance of the computing device 104. The threshold distance may be specified by the user, such as twenty meters. The computing device 104 may determine the threshold distance based on the loudness of the speech of the user 102. The user 102 may speak at the volume that the user 102 will speak at the meeting. The computing device 104 may detect the speech of the user 102 and determine an approximate distance that the voice of the user 102 may travel. The computing device 104 may include that distance in the request 124. The user 102 may indicate for the computing device 104 to provide location data using GPS data. In some implementations, the user 102 may not specify how the computing device 104 should provide location data. In this case, the computing device 104 and/or the server 136 may determine how to determine the location of the computing device 104.

In some implementations, each of the computing devices 104, 108, 112, and 114 may store permissions that may indicate a permission level for disabling the recording feature of computing devices. The permissions of each computing device may be based on the user of the computing device and/or the position of the user within the company. For example, the entry level employees of the company may have a low permission level that is stored in the permissions of their computing devices. The vice presidents may have a medium permission level that is stored in the permissions of their computing devices. The president may have a high permission level that is stored in the permissions of the computing device of the president. The permissions may ensure that a user with a lower permission level is not able to disable the recording features of a user with a higher permission level. For example, the medium permission level of a vice president may allow the vice president to disable the recording features of the computing devices of the entry level employees but not the recording feature of the computing device of the president.

In the example of FIG. 1, the request 124 may include the permissions 120 stored on the computing device 104. The permissions 120 may correspond to the position that the user 102 has in the company. The user 102 may indicate, in the request 124, to disable the recording features for one hour in the room 180 where the computing device 104 is located.

The server 136 receives the request 124. The server 136 may be included in or in communication with a network such as a wireless carrier network that provides voice and data communication services to multiple devices, such as the computing devices 104, 108, 112, and 114 and other devices. The wireless carrier network may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), 5th Generation (5G) wireless systems, CDMA-2000 (Code Division Multiple Access 2000), and/or other similar standards.

The wireless carrier network may include a radio access network and a core network 146. The radio access network may include multiple base stations. The multiple base stations are responsible for handling voice and data traffic between multiple subscriber devices, such as the computing devices 104, 108, 112, and 114 and other devices and the core network 146. Accordingly, each of the base stations may provide a corresponding network cell that delivers telecommunication and data communication coverage. The core network 146 may use the network cells to provide communication services to the multiple subscriber devices. For example, the core network 146 may connect the multiple subscriber devices to other telecommunication and data communication networks, such as the Internet and the public switched telephone network (PSTN). The base stations are responsible handling voice and data traffic between devices and the core network 146. In some implementations, the base stations may be in the form of eNodeB nodes. Each eNodeB node may include a base transceiver system (BTS) that communicates via an antenna system over an air-link with one or more devices that are within range. The antenna system of an eNodeB node may include multiple antennas that are mounted on a radio tower to provide a coverage area that is referred to as a "cell." The BTS may send RF signals to devices and receive radio signals from devices.

The server 136 includes a privacy management application 126 that is configured to receive and process the request 124. Processing the request 124 may include determining a location of the computing device 104 that provided the request, identifying the computing devices that the request 124 indicates to disable the recording function, and transmitting a request to disable the recording functions of the identified computing devices. In stage B, the privacy management application 126 determines the location of the computing device 104 by accessing the mobility manager 130 of the server 136.

The mobility manager 130 may be configured to monitor the location of a computing device that is connected to the server 136 through a wireless base station such as a gNodeB. The location of the computing device may include the location of the wireless base station to which the computing device is connected and/or GPS data received from the computing device. The mobility manager 130 may store the location data in the device locations 128 of the server 136.

In some implementations, the mobility manager 130 may determine the location of a computing device at periodic intervals, such as every five seconds. In some implementations, the mobility manager 130 may determine the location of a computing device when the computing device connects to a different wireless base station and/or provides updated GPS data. In some implementations, the mobility manager 130 may determine the location of the computing device relative to the base station with which the computing device is communicating. In this case, the mobility manager 130 may determine the relative location based on data collected from the base station such as signal strength and direction of communications between the computing device and the base station. The mobility manager 130 may also determine the relative location based on the location of the base station and GPS data received from the computing device. The relative location data may include a distance between the computing device and the base station, the cardinal direction from the base station to the subscriber device, and/or any other similar measurements.

The privacy management application 126 provides a location request 132 to the mobility manager 130. The location request 132 (e.g., a request for the location of computing device 104) includes data identifying the computing device 104 and a request to provide the location of the computing device 104. The mobility manager 130 receives the location request 132 and determines the location of the computing device 104 using the location data stored in the device locations 128. In some implementations, the mobility manager 130 may receive the location request 132 and update the data indicating the location of the computing device 104 in the device locations 128 in response to receiving the location request 132. The mobility manager 130 provides the location data 134 indicating the location of the computing device 104 to the privacy management application 126.

The privacy management application 126 receives, from the mobility manager 130, the location data 134 that indicates the location of the computing device 104. Based on the location data 134 and the instructions in the request 124, the privacy management application 126 determines the next actions. The request 124 may specify to disable the recording features of computing devices that are within a threshold distance of the computing device 104. In this case, the privacy management application 126 may determine which computing devices are within the threshold distance of the computing device 104 by communicating with the mobility manger 130. The request 124 may specify to disable the recording features of computing devices that are in the same room 180 as the computing device 104. In this case, the privacy management application 126 may determine characteristics of the location of the computing device 104 and communicate with the mobility manager 130 to identify the other computing devices in the room 180. The request 124 may specify to disable the recording features of computing devices that are able to detect the speech of the user 102 at a certain decibel level. In this case, the privacy management application 126 may receive, from the computing device 104, data indicating a loudness of the utterance 118 and other utterances of the user 102. The privacy management application 126 may also determine characteristics of the location of the computing device 104 to be able to determine how the utterances of the user 102 may decrease in loudness as audio waves of the utterances of the user 102 emanate from the user 102.

In stage C, the privacy management application 126 determines to access building information for the building where the computing device 104 is located. This determination may be based on the instructions and/or data included in the request 124 that indicated to disable the recording functions of computing devices in the same room 180 as the computing device 104. The privacy management application 126 may access mapping data to determine the building where the computing device 104 is located. The privacy management application 126 may determine the address of the building that includes the room 180.

The privacy management application 126 may transmit a building information request 142 that requests the layout and/or floorplan of the building that includes the room 180. The building information request 142 may include an address of the building, a GPS location of the building, and/or any other identifying information of the building. The building server 138 may receive the building information request 142. The building server 138 may store or be able to access the building maps storage 140 that includes building information for one or more buildings. The building server 138 may access the building information 144 that includes a layout for the building that includes the room 180. The building server 138 may provide the building information 144 to the server 136. The privacy management application 126 may receive the building information 144. The server 136 may communicate with the building server 138 through the internet, a local area network, a wireless wide area network, or any other similar type of network.

The privacy management application 126 may compare the building information 144 to the location of the computing device 104. Based on the location of the computing device 104, the privacy management application 126 may determine the layout of the room 180. In some implementations, the building information 144 may indicate that the building where the computing device 104 is located is a multistory building. In this case, the privacy management application 126 may request the GPS information from the computing device 104, if the computing device 104 did not already provide GPS information. Using the altitude of the GPS information, the privacy management application 126 may determine the location and layout of the room 180 within the building.

In some implementations, the privacy management application 126 may be unable to access the building server 138 and/or another computing device that stores or has access to building information where the computing device 104 is located. In this case, the privacy management application 126 may provide a request to the computing device 104 to provide more information regarding how to identify the computing devices that the privacy management application 126 should disable the recording features. The privacy management application 126 may request, from the computing device 104, a threshold distance where the privacy management application 126 will attempt to disable the recording features of the computing devices. The user 102 may estimate a threshold distance and provide that data to the computing device 104. In some instances, the privacy management client 122 may estimate the threshold distance based on the loudness of the utterance 118 and other utterances spoken by the user 102.

In some implementations, the privacy management application 126 may be unable to access the building server 138 and/or another computing device that stores or has access to building information where the computing device 104 is located. In some instances, the room where the computing device 104 is located may include RFID tags, short-range radio, infrared beacons, and/or any other similar devices that are configured to communicate with computing devices. The RFID tags, short-range radio, infrared beacons, and/or other similar devices may be located on walls. When the privacy management application 126 identifies the location of the computing device 104, the privacy management application 126 may identify other computing devices in the vicinity of the computing device 104, such as computing devices 108, 112, and/or 114. The privacy management application 126 may request that the computing devices 104, 108, 112, and/or 114 determine whether there are any RFID tags, short-range radio, infrared beacons, and/or other similar devices that the computing devices 104, 108, 112, and/or 114. The computing devices 104, 108, 112, and/or 114 may communicate with the RFID tags, short-range radio, infrared beacons, and/or other similar devices and provide the privacy management application 126 with location data of the computing devices 104, 108, 112, and/or 114 and communication parameters with the RFID tags, short-range radio, infrared beacons, and/or other similar devices. The communication parameters may include a signal strength and/or directionality of a signal used to communicate with or that is received from the RFID tags, short-range radio, infrared beacons, and/or other similar devices. The privacy management application 126 may estimate the layout of the room based on the communication parameters and determine which of the computing devices 108, 112, and/or 114 are likely in the same room as the computing device 104.

In some implementations, the RFID tags, short-range radio, infrared beacons, and/or other similar devices may store data regarding the layout of the room where they are located. In this case, the computing devices 104, 108, 112, and 114 may communicate with the RFID tags, short-range radio, infrared beacons, and/or other similar devices and access the stored data. The computing devices 104, 108, 112, and/or 114 may provide the stored data to the privacy management application 126. Based on the stored data, the privacy management application 126 may determine which of the computing devices 108, 112, and/or 114 are likely in the same room as the computing device 104.

In stage D, the privacy management application 126 identifies the computing devices that are located in the room 180. The privacy management application 126 provides the request 148 to the mobility manager 130. The request 148 may request data identifying the computing devices that are in a location specified in the request 148. If the user 102 identified a threshold distance around the computing device 104, then the request 148 may include the location of the computing device 104 and the threshold distance. If the user 102 indicated to disable the recording feature of computing devices in the room 180 where the computing device 104 is located, then the request 148 may include a layout of the room 180, which may include the dimensions of the room, and data identifying a location in the room 180. The location may be a corner of the room 180, the center of the room 180, and/or any other similar location that allows the mobility manager 130 to determine where to search for computing devices.

The mobility manager 130 receives the request 148 and determines the locations of the boundaries of the room 180. The mobility manager 130 determines the boundaries of the room 180 based on the layout of the room 180 included in the request 148 and the data identifying a location on the layout. The mobility manager 130 accesses the device locations 128 to determine which computing devices are located in the room 180. If the mobility manager 130 receives data indicating the location of the computing device 104 and a threshold distance, then the mobility manager may identify the area within which to identify the computing devices based on the location of the computing device 104 and the threshold distance.

In some implementations, the request 148 may identify another characteristic of the computing devices to identify. For example, the request 148 may indicate to identify the computing devices that are communicating with a particular wireless access point and/or that are communicating with a particular device using short range radio. The privacy management application 126 may identify these characteristics based on instructions and/or data included in the request 124 and/or based on information included in the building information 144.

The mobility manager 130 identifies the computing devices that are located in the location specified in the request 148. The mobility manager 130 may provide computing device location information 150 that includes data identifying the computing devices that are in the location specified by the request 148. The computing device location information 150 may identify computing devices, 108, 112, and 114 as those computing devices that are in the location specified by the request 148.

In some implementations, the privacy management application 126 may use alternative or additional factors to identify the computing devices that match the request 124 and/or are located in the location specified by the request 148. The request 124 may indicate to disable the recording features of the computing devices that have received and/or accepted an invitation to a particular meeting. The privacy management application 126 may access a calendar server to identify the users who have received and/or accepted an invitation to the particular meeting. The privacy management application 126 may identify the computing devices that are used by those users and attempt to disable the recording features of those computing devices.

In some implementations, the privacy management application 126 may automatically access the calendar server to verify or confirm the computing devices that are in the location specified by the request 148. The privacy management application 126 may receive a request 124 to disable the recording features of computing devices in the room 180. The privacy management application 126 may identify computing devices by communicating with the mobility manager 130 and the building server 138. The privacy management application 126 may also access the calendar server to determine whether there is a scheduled event in room 180 to which other users have been invited. The privacy management application 126 may identify computing devices based on calendar information. The privacy management application 126 may attempt to disable the recording features of computing devices that have received and/or accepted an invitation to a meeting in the room 180 and/or the computing devices that are in the location specified by the request 148.

In stage E, the privacy management application 126 attempts to disable the recording feature of the computing device 108. The computing device 108 includes a privacy management client 154 that is configured to communicate with the privacy management application 126 of the server 136. The computing device 108 includes a microphone 158 that is configured to detect audio. The microphone 158 may provide audio data to an audio subsystem that processes the received audio. If the recording status 160 is enabled, then the audio subsystem may provide the processed audio to a storage device on or accessible by the computing device 108. If the recording status 160 is disabled, then the audio subsystem may not be able to provide the processed audio to a storage device on or accessible by the computing device 108.

The computing device 108 may include permissions data 156. The permissions data 156 may indicate the permissions level of the user 106. The permissions level of the user 106 may be based on the role of the user 106 in the company that employs the user 106 and/or manages the computing device 108.

The privacy management application 126 provides a disable request 152 to the computing device 108. The disable request 152 may include data identifying the permissions of the computing device 104, an instruction to disable a recording function of the computing device 104, data identifying a time period to disable the recording function of the computing device 104, and/or data identifying a location where the recording function of the computing device 104 should be disabled.

The privacy management client 154 receives the disable request 152 and compares the permissions included in the disable request 152 to the permissions data 156. The privacy management client 154 may determine that the permissions included in the disable request 152 are higher than the permissions included in the permissions data 156. Based on that comparison, the privacy management client 154 may update the recording status 160 to be disabled. This may prevent the microphone 158 from detecting audio and/or prevent the computing device 108 from storing audio data detected by the microphone 158.

The privacy management client 154 generates a disable confirmation 162 based on updating the recording status 160 to be disabled. The disable confirmation 162 may indicate that the privacy management client 154 was able to comply with the instructions included in the disable request 152 and that the recording status 160 is disabled. In some implementations, the disable confirmation 162 may include additional information such as how long the recording status 160 may be disabled and/or the locations where the privacy management client 154 will continue to maintain the recording status 160 to be disabled.

In some implementations, the privacy management client 154 may generate a graphical interface indicating the recording status 160. The user 106 may view the graphical interface on a display of the computing device 108. For example, while the recording status 160 of the computing device 108 is disabled, the privacy management client 154 may generate a graphical interface or icon indicating that recording is disabled. This graphical interface may include data identifying the computing device 104, the user 102, the time period that the recording status 160 of the computing device 108 is disabled, the location where the recording status 160 of the computing device 108 is disabled, and/or any other similar information.

In stage F, the privacy management application 126 attempts to disable the recording feature of the computing device 112. The computing device 112 includes a privacy management client 166 that is configured to communicate with the privacy management application 126 of the server 136. The computing device 112 includes a microphone 168 that is configured to detect audio. The microphone 168 may provide audio data to an audio subsystem that processes the received audio. If the recording status 170 is enabled, then the audio subsystem may provide the processed audio to a storage device on or accessible by the computing device 112. If the recording status 170 is disabled, then the audio subsystem may not be able to provide the processed audio to a storage device on or accessible by the computing device 112.

The computing device 112 may include permissions data 172. The permissions data 172 may indicate the permissions level of the user 110. The permissions level of the user 110 may be based on the role of the user 10 in the company that employs the user 110 and/or manages the computing device 112.

The privacy management application 126 provides a disable request 164 to the computing device 112. The disable request 164 may include data identifying the permissions of the computing device 112, an instruction to disable a recording function of the computing device 112, data identifying a time period to disable the recording function of the computing device 112, and/or data identifying a location where the recording function of the computing device 112 should be disabled.

The privacy management client 166 receives the disable request 164 and compares the permissions included in the disable request 164 to the permissions data 172. The privacy management client 166 may determine that the permissions included in the disable request 164 are lower than the permissions included in the permissions data 172. Based on that comparison, the privacy management client 166 may maintain the recording status 170. If the recording status 170 is enabled or disabled, then the privacy management client 166 may not change the recording status. If the recording status is enabled, then the microphone 168 may be able to detect audio and/or the computing device 112 may be able to store audio data detected by the microphone 168.

The privacy management client 154 generates an override indication 174 based on the permissions included in the disable request 164 being lower than the permissions included in the permissions data 172. The override indication 174 may indicate that the privacy management client 166 was unable to comply with the instructions included in the disable request 164. In some implementations, the override indication 174 may indicate the recording status 170, the location of the computing device 112, data identifying the user 110, and/or any other similar information.

In some implementations, the privacy management client 166 may generate a graphical interface based on the disable request 164. The user 110 may view the graphical interface on a display of the computing device 112. The graphical interface may indicate that the computing device 112 received the disable request 164 and provide a selectable option to comply with the disable request 164. The graphical interface may include data identifying the computing device 104, the user 102, the time period that the disable request 164 indicated to disable the recording status 170 of the computing device 112, the location where the disable request 164 indicated to disable the recording status 170 of the computing device 112, and/or any other similar information. The graphical interface may indicate that the user 110 and/or the computing device 112 is not required to comply with the disable request 164.

In some implementations, the user 110 may select, from the graphical interface, the option to comply with the disable request 164. In this case, the privacy management client 166 may generate a compliance indication instead of the override indication 174. The privacy management client 166 may provide the compliance indication to the privacy management application 126. The compliance indication may indicate the recording status 170, the location of the computing device 112, data identifying the user 110, and/or any other similar information. In some instances, the privacy management client 166 may generate the override indication 174 if the recording status 170 changes during the time period that the disable request 164 indicated to disable the recording status 170 of the computing device 112 and the computing device 112 is in the location specified in the disable request 164.

The privacy management application 126 may have received data identifying the computing device 114 from the mobility manager 130. The computing device 114 includes a microphone 176. The recording status 178 of the microphone 176 indicates whether the computing device 114 is able to record audio. The mobility manger 130 indicated in the computing device location information 150 that the computing device 114 is located in the room 180. The privacy management application 126 may attempt to communicate with the computing device 114 and provide a disable request. The privacy management application 126 may determine that the computing device 114 does not include a privacy management client. Without a privacy management client, the privacy management application 126 may be unable to provide a disable request to the computing device 114. In this case, the user 116 may remain in control of the recording status 178. In some instances, the privacy management application 126 may not receive data indicating the recording status 178 from the computing device 114 because the computing device 114 does not include a privacy management client.

In stage G, the privacy management application 126 generates a summary 182 and provide the summary 182 to the computing device 104. The summary 182 may indicate the status of the attempts of the privacy management application 126 to implement the instructions in the request 124, such as instructions to disable the recording features of computing devices in the room 180. The summary 182 may identify the computing devices that are located in the room 180 and/or the users of each computing device located in the room 180. In instances where the server 136 was unable to implement the instructions in the request 124, the summary 182 may indicate the reason. The summary may indicate that the server 136 was able to disable the recording feature of the computing device 108, that the server 136 was not able to disable the recording feature of the computing device 112 because the permissions data 172 overrode the permissions data 120, and that the server 136 was not able to disable the recording feature of the computing device 114 because the computing device 114 did not include a privacy management client 166.

The privacy management client 122 may generate a graphical interface based on the summary 182. The privacy management client 122 may display that graphical interface on the display of the computing device 104, and the user 102 may view the graphical interface. The user 102 may take additional actions based on the graphical interface. For example, that the user 102 avoid discussing sensitive topics.

In some implementations, the privacy management application 126 may continue to update the summary 182 based on changes in the computing devices that are located in the room 180 and/or changes in the recording status of the computing devices that are located in the room 180. During the time period specified in the request 124, the privacy management application 126 may monitor the computing devices that are located in the room 180 by communicating with the mobility manager 130. If a new computing device arrives in the room 180 during the time period, then the privacy management application 126 may attempt to update the recording status of the new computing device. The privacy management application 126 may update the summary 182 indicating the arrival of the new computing device and indicate whether the privacy management application 126 was able to disable the recording status of the new computing device.

If a computing device leaves the room 180 during the time period, then the privacy management application 126 may update the summary 182 indicating the departure of the computing device 114. For example, if the computing device 114 leaves the room 180, then the privacy management application 126 may update the summary 182 to indicate that the computing device 114 is no longer in the room 180.

At the conclusion of the meeting or at the end of the time period specified in the request 124, the privacy management application 126 transmits instructions to the privacy management clients to return control of the recording status to the user and/or the computing device. For example, at the end of the meeting, the privacy management application 126 transmits, to the privacy management client 154 of the computing device 108, data indicating to return control of the recording status 160 to the computing device 108. Because the privacy management application 126 was unable to update the recording status 170 of the computing device 112 and the recording status 178 of the computing device 114, the privacy management application 126 may not transmit data indicating to return control of the recording status.

In some implementations, the functionality of the privacy management client 122 may be incorporated into the operating system of the computing device 104. Similarly, the privacy management clients 154 and 166 may be incorporated into the operating systems of the computing devices 108 and 112. The server 136 may communicate with these operating systems. The permissions 120, 156, and 172 may also be incorporated into the operating systems.

Figure 2:
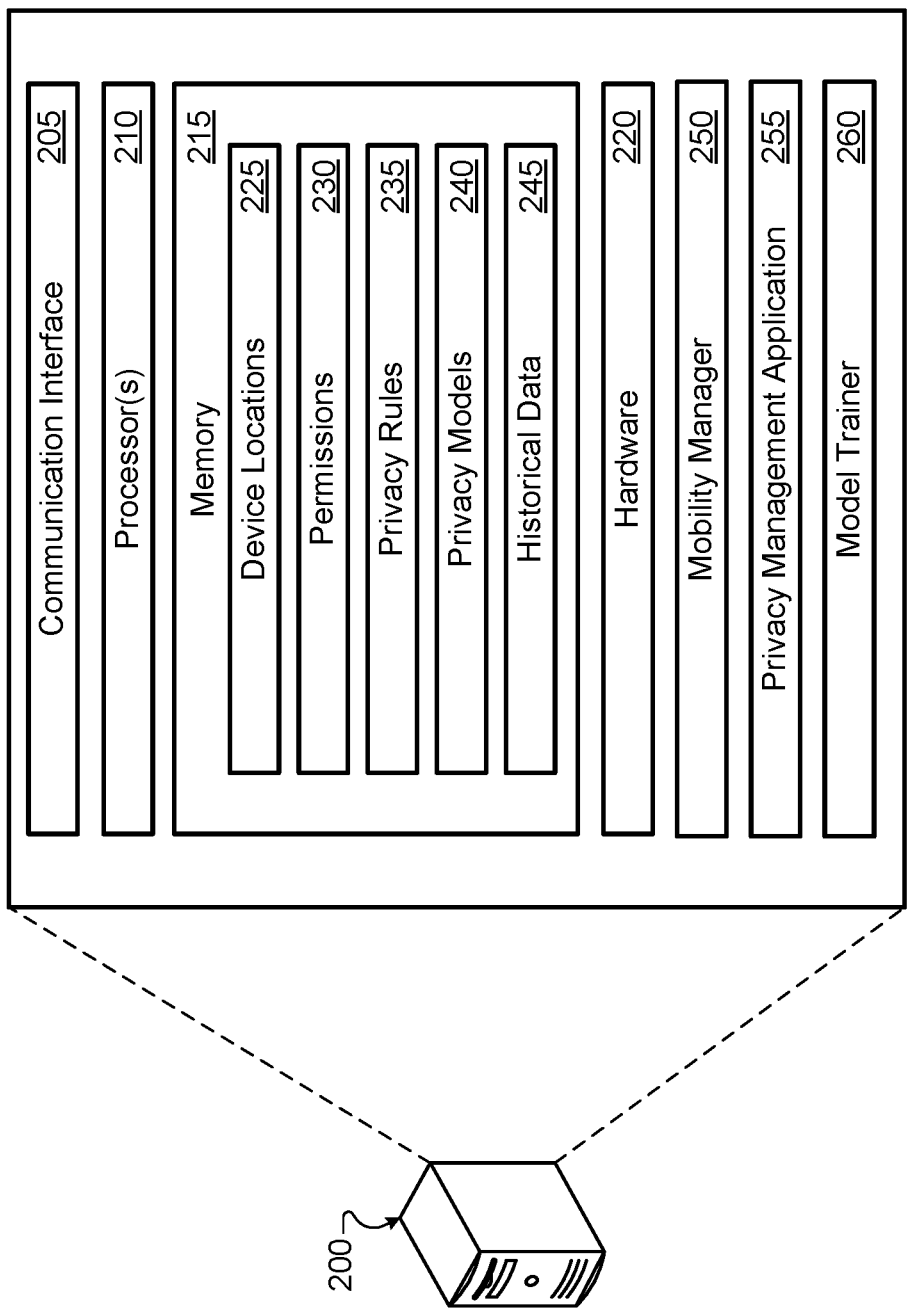
FIG. 2 illustrates an example server that is configured to adjust recording functions of computing devices.

FIG. 2 illustrates an example server 200 that is configured to adjust recording functions of computing devices. The server 200 may be any type of computing device that is configured to be integrated into a wireless carrier network or interact with a wireless carrier network. For example, the server 200 may be similar to the server 136 of FIG. 1. Some of the components of the server 200 may be implemented in a single computing device or distributed over multiple computing devices. Some of the components may be in the form of virtual machines or software containers that are hosted in a cloud in communication with disaggregated storage devices.

The server 200 may include a communication interface 205, one or more processors 210, memory 215, and hardware 220. The communication interface 205 may include communication components that enable the server 200 to transmit data and receive data from devices connected to the wireless carrier network. The communication interface 205 may include an interface that is configured to communicate with base stations of a wireless carrier network. The communication interface 205 may receive data that other devices transmit to the base stations and/or transmit data to the base stations for transmission to the other devices.

The hardware 220 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 215 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 210 may implement a mobility manager 250. The mobility manager 250 may be similar to the mobility manager 130 of FIG. 1. The mobility manager 250 may be configured to monitor the location of a computing device that is connected to the server 200 through a wireless base station such as a gNodeB. The location of the computing device may include the wireless base station to which the computing device is connected and/or GPS data received from the subscriber device. The mobility manager 250 may store the location data in the device locations 225 that is implemented by the memory 215.

In some implementations, the mobility manager 250 may determine the location of a computing device at periodic intervals, such as every five seconds. In some implementations, the mobility manager 250 may determine the location of a computing device when the computing device connects to a different wireless base station and/or provides updated GPS data. In some implementations, the mobility manager 250 may determine the location of the computing device relative to the base station with which the computing device is communicating. In this case, the mobility manager 250 may determine the relative location based on data collected from the base station such as signal strength and direction of communications between the computing device and the base station. The mobility manager 250 may also determine the relative location based on the location of the base station and GPS data received from the computing device. The relative location data may include a distance between the computing device and the base station, the cardinal direction from the base station to the subscriber device, and/or any other similar measurements.

The one or more processors 210 may implement a privacy management application 255. The privacy management application 255 may be similar to the privacy management application 126 of FIG. 1. The privacy management application 255 may be configured to receive and implement instructions regarding changing the recording functions of computing devices that are located within a specified area during a period of time. The privacy management application 255 may communicate with the mobility manager 250 to determine the computing devices that are located in the specified area. In some implementations the privacy management application 255 may communicate with an additional computing device to determine characteristics of the specified area to determine what computing devices are located there.

The privacy management application 255 may be configured to receive and provide instructions to other devices that include a privacy management client. In some instances, the privacy management application 255 may not be able to receive and provide instructions regarding changing the recording functions of other devices that do not include a privacy management client or similar on-board functionality.

The privacy management application 255 may be configured to output a summary of the recording functions of the computing devices in the specified area during the time period. The privacy management application 255 may maintain data indicating the recording status of each computing device in the specified area in the memory 315. After attempting to change the recording functions of the computing devices in the specified areas, the privacy management application 255 may output a summary that indicates the recording status of the computing devices in the specified area. During the time period, the privacy management application 255 may update the summary based on computing devices entering or leaving the specified area. The summary may include data identifying each computing device, data identifying each user, the recording function of each computing device, a reason for whether the privacy management application 255 was able to adjust the recording function, and/or any other similar information.

The privacy management application 255 may be configured to maintain the permissions 230 that includes the permission levels of the various computing devices that the privacy management application 255 is able to adjust the recording status. For example, a first computing device may have a permission level of five. A second computing device may have a permission level of three. The privacy management application 255 may store and access these permissions 230 when implementing instructions to adjust recording statuses.

If the privacy management application 255 receives an instruction to adjust the recording functions of other computing devices in a particular area during a period of time, then the privacy management application 255 may compare the permissions 230 of each computing device in the particular area to determine whether the user of the computing device has permission to adjust the recording function. If the instructing computing device has a permission level of 3, then the privacy management application 255 may adjust the recording functions of computing devices in the particular area with a permission level of 3 or lower. The privacy management application 255 may be unable to adjust the recording functions of computing devices in the particular area with a permission level greater than 3.

The one or more processors 210 may implement a model trainer 260. The model trainer may be configured to train the privacy models 240 using the historical data 245 and machine learning. The server 200 may provide the privacy models 240 to computing devices. The privacy models 240 may be configured to determine when to automatically instruct nearby computing devices to adjust recording functions. In some instances, computing devices receive instructions from users regarding when to adjust recording functions of nearby devices. With the privacy models 240, a computing device may be configured to automatically detect situations where the recording functions of nearby computing devices should be adjusted.

The historical data 245 may include data captured by computing devices that received instructions from users to adjust the recording function of nearby computing devices. The data captured may include a location and type of the computing device that received instructions from the users, audio detected by the computing device that received instructions from the users, a time of day, instructions received from the users, characteristics of the area around the computing device that received instructions from users, the permission level of the users, the nearby computing devices that implemented the instructions to adjust the recording function, the nearby computing devices that did not implement the instructions to adjust the recording function, and/or any other similar data. The instructions received from the users may be related to the time period during which to adjust the recording function of nearby computing devices and a location that indicates what computing devices may be identified as nearby computing devices. The characteristics of the area around the computing device that received instructions from users may relate to whether the computing device is indoors or outdoors, a floor that the computing device is on, if the computing device is indoors, and any other similar characteristics.

The historical data 245 may also include data captured by computing devices during times other than when the computing devices received instructions from users to adjust the recording function of nearby computing devices. The data captured may include a location and type of the computing device, audio detected by the computing device, a time of day, characteristics of the area around the computing device, the permission level of the users, data identifying nearby computing devices, and/or any other similar data.

The model trainer 260 may train the privacy models 240 to determine when to automatically generate an instruction to adjust the recording function of nearby computing devices. This instruction may be to disable the recording function of nearby computing devices. The privacy models 240 may be configured to receive data identifying a location and type of the computing device, audio detected by the computing device, a time of day, characteristics of the area around the computing device, the permission level of the users, and/or data identifying nearby computing devices. The privacy models 240 may be configured to output data indicating whether to adjust the recording function of nearby computing devices.

The model trainer 260 may generate data samples using the historical data 245 collected from each computing device. Each data sample may include a snapshot of the historical data 245 at different times. For example, during a one hour meeting where the computing device and/or server 200 is attempting to disable the recording features of the nearby computing devices, the model trainer 260 may generate a data sample that represents the collected data at five minute intervals. A first data sample may include the location of the computing device, the type of the computing device, audio detected during a previous period of time (e.g., ten minutes), the time of day, whether the computing device is indoors or outdoors, the permission level of the user of the computing device, nearby computing devices that are within a threshold distance of the computing device (e.g., twenty meters), and whether the computing device and/or the server 200 is attempting disable a recording feature of the nearby computing devices. A second data sample may include the location of the computing device, the type of the computing device, audio detected during a previous period of time (e.g., fifteen minutes), the time of day, whether the computing device is indoors or outdoors, the permission level of the user of the computing device, nearby computing devices that are within a threshold distance of the computing device (e.g., twenty meters), and data indicating that the computing device and/or the server 200 is attempting disable the recording features of the nearby computing devices.

The model trainer 260 may generate other data samples using the historical data 245 during times when each computing device or the server 200 was not attempting to disable a recording feature of the nearby computing devices. A third data sample may include the location of the computing device, the type of the computing device, audio detected during a previous period of time (e.g., ten minutes), the time of day, whether the computing device is indoors or outdoors, the permission level of the user of the computing device, nearby computing devices that are within a threshold distance of the computing device (e.g., twenty meters), and data indicating that the computing device and/or the server 200 is not attempting disable the recording features of the nearby computing devices.

The model trainer 260 may train the privacy models 240 using the data samples and machine learning. The server 200 may provide the privacy models 240 to the computing devices. A computing device may provide the models with an input that includes the location of the computing device, the type of the computing device, audio detected by the computing device during a previous period of time, the time of day, whether the computing device is indoors or outdoors, the permission level of the user of the computing device, and/or nearby computing devices that are within a threshold distance of the computing device. The privacy model may output data indicating whether to attempt to disable the recording features of the nearby computing devices.

The one or more processors 210 may analyze the historical data 245 to determine patterns that may indicate that a computing device and/or the server 200 is more or less likely to attempt to disable the recording features of the nearby computing devices based on various factors. Based on these patterns, the one or more processors 210 may generate privacy rules 235. The privacy rules 235 may be configured to compare various factors such as the location of the computing device, the type of the computing device, audio detected by the computing device during a previous period of time, the time of day, whether the computing device is indoors or outdoors, the permission level of the user of the computing device, and/or nearby computing devices that are within a threshold distance of the computing device and determine whether to attempt to disable the recording features of the nearby computing devices.

In identifying patterns in the historical data 245, the one or more processors 210 may determine that if the audio detected by the computing device during a previous period of time includes an utterance "do not record," then the computing device or the server 200 was attempting to disable the recording features of the nearby computing devices. The one or more processors 210 may also determine that if the computing device is located in a particular meeting room on Wednesday at 3:00 pm, then the computing device or the server 200 was attempting to disable the recording features of the nearby computing devices. The one or more processors 210 may generate the privacy rules 235 based on these patterns. A privacy rule may indicate to disable the recording features of the nearby computing devices if the computing device detects the utterance, "do not record." In some instances, the privacy rule may indicate that the speaker of this utterance is the user of the computing device. Another privacy rule may indicate to disable the recording features of the nearby computing devices if the computing device is in the particular meeting room on Wednesday at 3:00 μm.

The server 200 may provide the privacy rules 235 to the computing devices. The privacy management clients of the computing devices may implement the privacy rules 235. In some implementations, the privacy management clients of the computing devices may use a combination of the privacy rules 235 and the privacy models 240 to determine whether to disable the recording features of the nearby computing devices. The server 200 may update the privacy models 240 and/or the privacy rules 235 as the server 200 receives additional historical data. In this case, the server 200 may provide the updates privacy models 240 and/or the privacy rules 235 to the computing devices.

Figure 3:
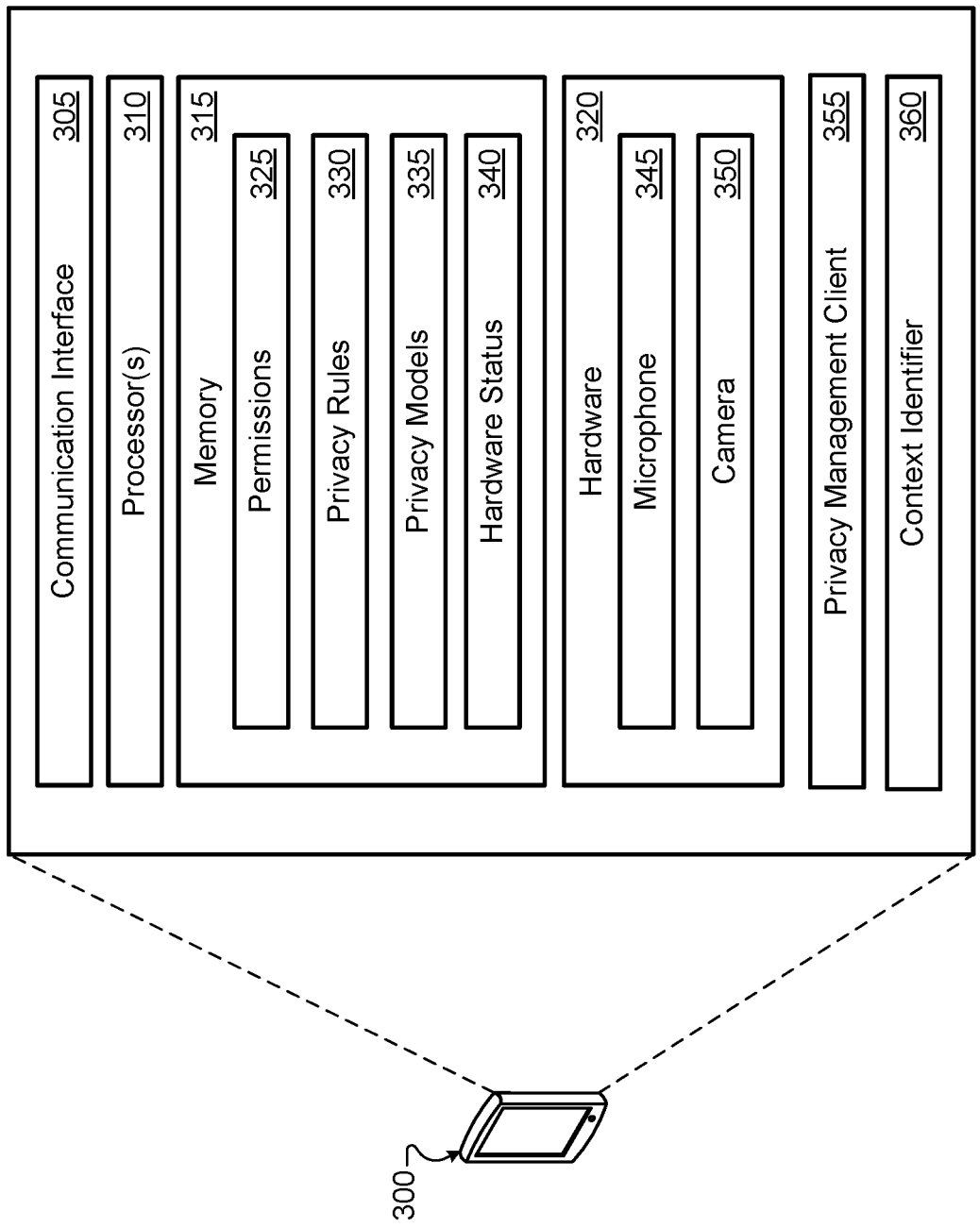
FIG. 3 illustrates an example computing device that is configured to receive and output instructions to adjust recording functions.

FIG. 3 illustrates an example computing device 300 that is configured to receive and output instructions to adjust recording functions. The computing device 300 may be configured to be integrated into a wireless carrier network or interact with a wireless carrier network. The computing device 300 may be configured to communicate with a wired or wireless network. For example, the computing device 300 may be a mobile phone, tablet, laptop computer, wearable device, desktop computer, e-reader, or similar to the computing devices 104, 108, 112, and 114 of FIG. 1. Some of the components of the computing device 300 may be implemented in a single computing device or distributed over multiple computing devices. Some of the components may be in the form of virtual machines or software containers that are hosted in a cloud in communication with disaggregated storage devices.

The computing device 300 may include a communication interface 305, one or more processors 310, memory 315, and hardware 320. The communication interface 305 may include communication components that enable the computing device 300 to transmit data and receive data from devices connected to the wireless carrier network. The communication interface 205 may include an interface that is configured to communicate with base stations of a wireless carrier network. The communication interface 205 may receive data that other devices transmit to the base stations and/or transmit data to the base stations for transmission to the other devices.

The hardware 320 may include additional user interface, data communication, or data storage hardware. For example, the user interfaces may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices. As illustrated in FIG. 3, the computing device 300 includes a microphone 345 that is configured to detect audio and provide the detected audio to the one or more processors 310. The computing device 300 also includes a camera 350 that is configured to detect image and/or video data and provide the image and/or video data to the one or more processors 310.

The memory 315 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The one or more processors 210 may implement a privacy management client 355. The privacy management client 355 may be configured to receive and output, to a server, instructions to adjust the recording functions of nearby computing devices. The privacy management client 355 may also be included in the nearby computing devices and be configured to adjust the recording functions in response to instructions from a privacy management application of a server. If the privacy management client 355 determines to adjust the recording functions of the computing device 300, then the privacy management client 355 may update the hardware status 340 that includes data indicating whether the microphone 345 and/or the camera 350 are able to record. For example, the hardware status 340 may indicate that the microphone 345 and camera 350 are both disabled. As another example, the hardware status 340 may indicate that the microphone 345 is disabled and the camera 350 is enabled.

The privacy management client 355 may use a combination of the privacy rules 330, the privacy models 335, the permissions 325, and/or data from the context identifier 360 to determine whether to output, to a server, instructions to adjust the recording functions of nearby computing devices. The privacy management client 355 may also use the permissions 325 to determine whether to comply with instructions to adjust the hardware status 340 received from a server.

In instances where the privacy management client 355 determines whether to output, to a server, instructions to adjust the recording functions of nearby computing devices, the privacy management client 355 may use two approaches. A first approach would be for the privacy management client 355 to receive instructions from a user. The user may provide instructions to disable the recording features of nearby computing devices. The instructions may indicate a time period to disable the recording features and/or a location of where computing devices may be considered nearby.

The privacy management client 355 may output a request to the server to disable the recording features of nearby computing devices. The request may include a time period to disable the recording features, location of where computing devices may be considered nearby, and/or the permissions 325. The server receives the request and identifies the nearby computing devices. The server may provide instructions to each of the nearby computing devices to adjust the recording functions for the time specified in the user instruction. An example nearby computing device may also include a privacy management client 355 that receives the instructions from the server. The nearby computing device may compare the permissions included in the instructions to the permissions 325 of the nearby computing device. If the permissions 325 of the nearby computing device are lower than the permissions included in the instructions, then the nearby computing device updates the hardware status 340 as requested. The privacy management client 355 of the nearby computing device may report back to the server indicating that the privacy management client 355 of the nearby computing device updated the hardware status 340 of the nearby computing device. If the permissions 325 of the nearby computing device are higher than the permissions included in the instructions, then the nearby computing device updates the hardware status 340 as requested. The privacy management client 355 of the nearby computing device may report back to the server indicating that the privacy management client 355 of the nearby computing device did not update the hardware status 340 of the nearby computing device because of the overriding permissions.

A second approach for the privacy management client 355 to determine whether to adjust the recording functions of nearby computing devices is to use the privacy rules 330, the privacy models 335, and/or context data from the context identifier 360. The privacy management client 355 may be able to automatically identify situations where the privacy management client 355 should generate and output a request to adjust the recording functions of nearby computing devices even in instances where the computing device 300 may not receive express instructions from a user.

The context identifier 360 may be configured to determine the context of the computing device 300. The context may include the location of the computing device 300, the type of the computing device 300, audio detected by the computing device 300, a transcription of the detected audio, the date and time, whether the computing device 300 is indoors or outdoors, the permissions 325, the nearby computing devices, and/or any other similar information. The privacy management client 355 may receive the context data from the context identifier 360 and provide the context data as an input to the privacy rules 330 and/or the privacy models 335. The privacy rules 330 and/or the privacy models 335 may output data indicating whether the privacy management client 355 should output a request to the server to adjust the recording functions of nearby computing devices.

The privacy management client 355 may select a privacy model from the privacy models 335 based on the context data received from the context identifier 360. The selected privacy model may be configured to receive the context data. For example, if the context data includes the location of the computing device, audio detected by the computing device 300, a transcription of the detected audio, the date, and the time, then the privacy management client 355 may select a privacy model that is configured to receive that data. If the context data also includes whether the computing device 300 is indoors or outdoors, then the privacy management client 355 may select a privacy model that is configured to receive that additional data.

The privacy management client 355 provides the context data to the selected privacy model. The selected privacy model outputs data indicating whether the privacy management client 355 should output a request to the server to adjust the recording functions of nearby computing devices. Based on that output, the privacy management client 355 may output a request to the server to adjust the recording functions of nearby computing devices. The context identifier 360 may continuously determine the context data. That privacy management client 355 may provide the updated context data to the privacy models 335. The privacy management client 355 may provide additional requests to the server regarding adjusting the recording functions of nearby computing devices depending on the output from the privacy models 335 that received the updated context data.

The privacy management client 355 may select a privacy rule from the privacy rules 330 based on the context data received from the context identifier 360. The selected privacy rules may be configured to compare one or more fields of the context data and output data indicating whether the privacy management client 355 should output a request to the server to adjust the recording functions of nearby computing devices. For example, the context data may include a transcription of an utterance that includes "do not record."

The privacy rules 330 may include a privacy rule that indicates to output data indicating that the privacy management client 355 should output a request to the server to adjust the recording functions of nearby computing devices if the context data includes the transcription, "do not record." In response to this output, the privacy management client 355 may output a request to the server to disable the recording functions of nearby computing devices.

The privacy management client 355 may use a combination of the privacy rules 330 and the privacy models 335 to determine whether to output a request to the server to adjust the recording functions of nearby computing devices. The privacy management client 355 may use a two=stage process where the privacy management client 355 determines whether to output a request to the server to adjust the recording functions of nearby computing devices based on the privacy rules 330. If a privacy rule indicates to output a request to the server to adjust the recording functions of nearby computing devices, then the privacy management client 355 may not access the privacy models 335. If the privacy rules 330 do not indicate to output a request to the server to adjust the recording functions of nearby computing devices, then the privacy management client 355 may access the privacy models 335. Based on the output of the privacy models 335, the privacy management client 355 may output a request to the server to adjust the recording functions of nearby computing devices. In some implementations, the two-stage process may require that the outputs of the privacy rules 330 and the privacy models 335 both indicate to disable the recording functions of the nearby computing devices. In this case, the privacy management client 355 may not output a request to the server to adjust the recording functions of nearby computing devices unless both the privacy rules 330 and the privacy models 335 indicate to disable the recording features of the nearby computing devices.

The computing device 300 may also represent a nearby computing device. If the nearby computing device receives, from a server, a request to disable the recording features of the nearby computing device, then the privacy management client 355 may process that request. The request may include a time period to disable the recording features, data identifying the recording features to disable, and the permissions of the computing device that originated the request. The privacy management client 355 may compare the permissions 325 to the permissions of the computing device that originated the request. If the permissions 325 are higher than the permissions of the computing device that originated the request, then the privacy management client 355 rejects the request and provides data indicating the permissions override. If the permissions 325 are lower or equal than the permissions of the computing device that originated the request, then the privacy management client 355 updates the hardware status 340 and provides data indicating the update to the server.

The privacy management client 355 of the nearby computing device may compare the data in the request to disable the recording features to the current status or characteristics of the nearby computing device. If the current status or characteristics do not match the request, then the privacy management client 355 may update the hardware status 340 to enabled. For example, if the request to disable the recording features indicates that the microphone 345 should be disabled for the next hour when in a particular room, then the privacy management client 355 may update the hardware status 340 to enabled for the microphone 345 if the nearby computing device is no longer in the particular room. The privacy management client 355 may transmit data indicating this movement and change to the hardware status 340 to the server. If the nearby computing device returns to the particular room during the time frame specified in the disable request, then the privacy management client 355 may update the hardware status 340 to disabled for the microphone 345. The privacy management client 355 may report this movement and change in the hardware status 340 to the server.

Figure 4:
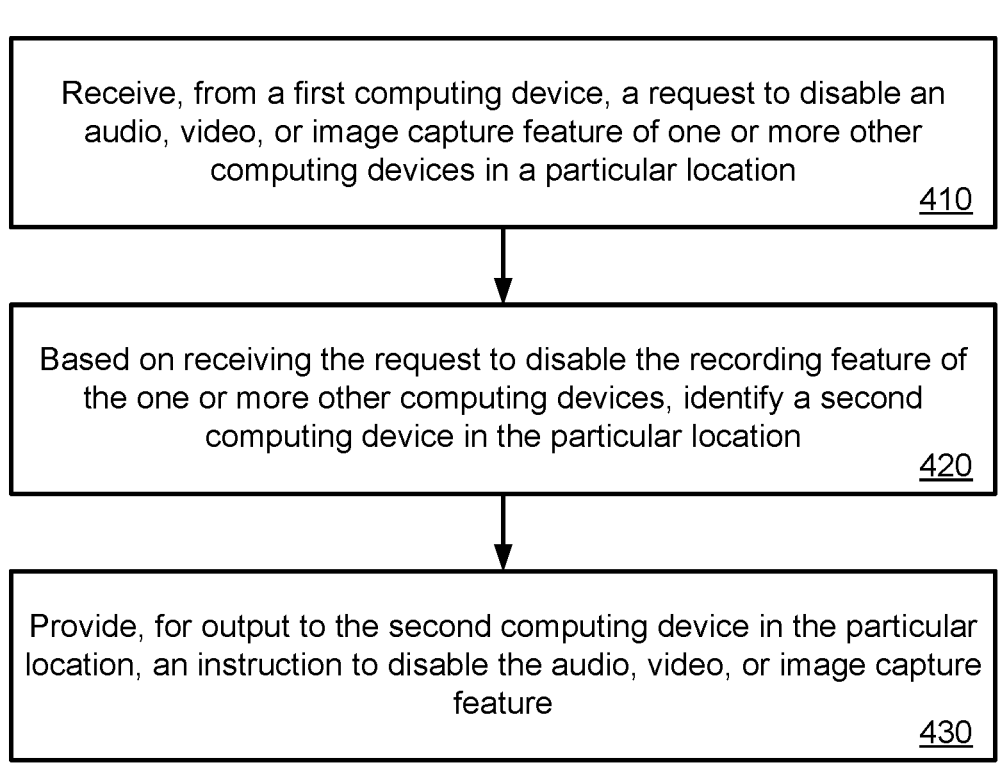
FIG. 4 is a flowchart of an example process for adjusting recording functions of computing devices.

FIG. 4 is a flowchart of an example process 400 for adjusting recording functions of computing devices. In general, the process 400 receives a request to disable the recording functions of computing devices located in a particular location. The process 400 identifies the computing devices in the particular location and transmits an instruction to disable their recording functions. The process 400 will be described as being performed by the server 136 of FIG. 1 and will include references to other components in FIG. 1. The process 400 may also be performed by the server 200 of FIG. 2.

The server 136 receives, from a first computing device 104, a request 124 to disable an audio, video, or image capture feature of one or more other computing devices in a particular location 180 (410). The user 102 of the first computing device 104 may be prepared to conduct a meeting that includes discussing confidential information. The user 102 may wish to prevent others in the meeting from recording the meeting. The recording feature may include the ability of the other computing devices to record audio using a microphone and/or record images or video using a camera. In some implementations, the particular location may include the room where the first computing device 104 is located. In some implementations, the particular location may include an area that is within a threshold distance of the first computing device 104. In some implementations, the audio, video, or image capture feature may be a recording feature that allows a computing device to capture and store audio, video, and/or image data either remotely or locally. The recording function and/or the recording feature may refer to this audio, video, or image capture feature.

Based on receiving the request to disable the recording feature of the one or more other computing devices, the server 136 identifies a second computing device 108, 112, or 114 in the particular location 180 (420). The server 136 may determine a location of the first computing device 104 using the mobility manager 130. The mobility manager 130 accesses data indicating the location of the first computing device 104. In instances where the request 124 indicates that the particular location 180 is the room of a building, the server 136 may access an external server to determine the layout of the building that includes the location of the first computing device 104. In instances where the request 124 indicates that the particular location includes a threshold distance from the first computing device 104, the server 136 may identify the area based on combining the threshold distance and the location of the first computing device 104.

The server 136 uses the mobility manager 130 again to determine the computing devices that are in the particular location 180, whether the particular location is a room in a building or a threshold distance from the location of the first computing device 104. The mobility manger 130 may identify second computing devices 108, 112, and 114 that are in the particular location 180.

With the second computing devices 108, 112, and 114 identified as being in the particular location 180, the server 136 may determine how to disable the recording features of the second computing devices 108, 112, and 114. The server 136 may determine that the second computing devices 108 and 112 are configured to receive and implement an instruction to disable the recording features of the second computing devices 108 and 112 based on the second computing devices 108 and 112 including the privacy management client. The privacy management client may allow the second computing devices 108 and 112 to receive instructions from the server 136 regarding changing the status of the recording functions of the computing devices 108 and 112. The server 136 may determine that the second computing device 114 is not configured to receive and implement an instruction to disable the recording features of the second computing device 114 because the second computing device 114 does not include the privacy management client.

In some implementations, the server 136 may compare the permissions 120 of the first computing device 104 with the permissions 156 and 172 of the second computing devices 108 and 112. If the permissions 120 of the first computing device are higher than the permissions 156 of the second computing device 108, then the server 136 may determine to instruct the second computing device 108 to disable the recording function of the second computing device 108. If the permissions 120 of the first computing device are lower than the permissions 172 of the second computing device 112, then the server 136 may determine to not instruct the second computing device 112 to disable the recording function of the second computing device 112.

The server 136 provides, for output to the second computing device 108, 112, or 114 in the particular location 180, an instruction to disable the audio, video, or image capture feature (430). The server 136 may provide, the second computing device 108, an instruction to disable the recording feature of the second computing device 108 based on the permissions 156 of the second computing device 108 being lower than the permissions 120 of the first computing device 104 and based on the second computing device 108 including the privacy management client 154. The server 136 may provide, the second computing device 112, an instruction to disable the recording feature of the second computing device 112 based on the second computing device 112 including the privacy management client 154. The second computing device 112 may not comply with the instruction because the permissions 172 of the second computing device 112 are higher than the permissions 120 of the first computing device 104. The server 136 may not be able to provide the second computing device 114 an instruction to disable the recording feature of the second computing device 114 based on the second computing device 114 not including a privacy management client.

In some implementations, the server 136 may determine that the second computing device 108 is no longer in the particular location 180. In this case, the server 136 may provide an instruction to the second computing device 108 to no longer comply with the instruction regarding adjusting the recording feature of the second computing device 108. Similarly, if the server 136 determines that a new computing device arrives in the particular location 180, then the server 136 may provide an instruction to the new computing device to adjust the recording feature of the new computing device.

In some implementations, the server 136 may provide a summary of the state of the recording functions of the second computing devices 108, 112, and 114 to the first computing device 104. The summary may indicate that the server 136 was able to disable the recording function of the second computing device 108. The summary may indicate that the server 136 was not able to disable the recording function of the second computing device 112 because the permissions 172 were higher than the permissions 120. The summary may indicate that the server 136 was not able to disable the recording function of the second computing device 114 because the second computing device 114 did not include a privacy management client. Based on the summary, the user 102 may decide how to proceed with the meeting.

Figure 5:
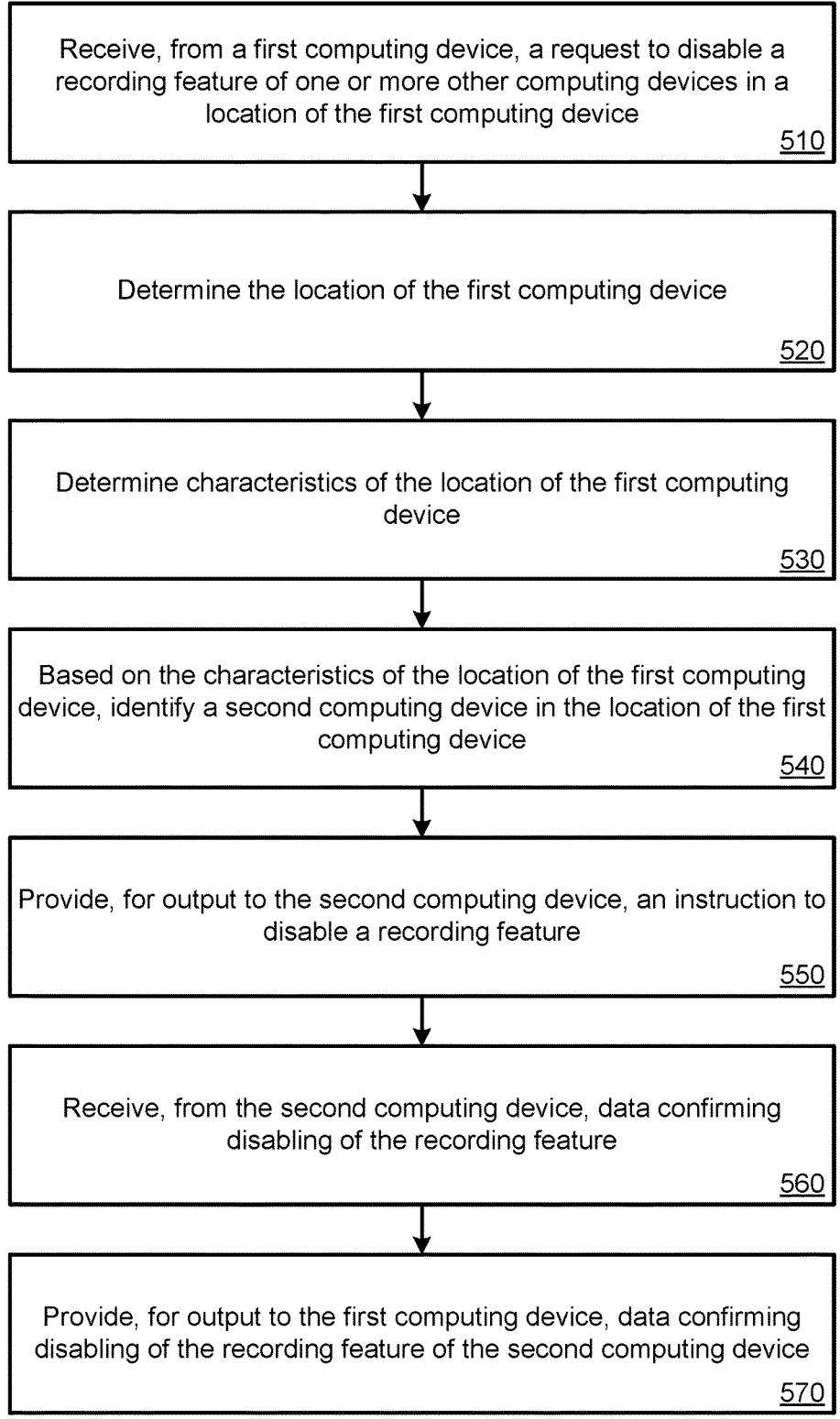
FIG. 5 is a flowchart of an example process for adjusting recording function of a computing device in a particular location.

FIG. 5 is a flowchart of an example process 500 for adjusting recording function of a computing device in a particular location. In general, the process 500 receives a request to disable the recording function of computing devices located in a particular location. The process 500 identifies a computing device in the particular location and transmits an instruction to disable the recording function. The identified computing device disables the recording function and outputs data confirming the disabling of the recording function. The process 500 will be described as being performed by the server 136 of FIG. 1 and will include references to other components in FIG. 1. The process 500 may also be performed by the server 200 of FIG. 2.

The server 136 receives, from a first computing device 104, a request 124 to disable a recording feature of one or more other computing devices in a location 180 of the first computing device 104 (510). The request 124 may include information related to the location 180. For example, the location 180 may be the area within a threshold distance of the first computing device 104. The location 180 may be the room where the computing device 104 is located. The request 124 may include a time period for disabling the recording feature of the one or more other computing devices. The server 136 may receive the request 124 using a privacy management application 126

The server 136 determines the location of the first computing device 104 (520). The server 136 may include a mobility manager 130. The mobility manager 130 may access data indicating the location of the first computing device 104. The server 136 determines characteristics of the location of the first computing device 104 (530). The server 136 may determine that the location of the first computing device 104 is in a building. The server 136 may determine the characteristics of the building such as the layout of the building and the room where the first computing device 104 is located.

Based on the characteristics of the location of the first computing device 104, the server 136 identifies a second computing device 108 in the location of the first computing device 104 (540). The characteristics of the location of the first computing device 104 may assist the server 136 in identifying an area to search for the one or more other computing devices. The area may be defined by the walls of a room or a distance from the first computing device 104. The mobility manger 130 may determine that the second computing device 108 is located in the area.

The server 136 provides, for output to the second computing device 108, an instruction 152 to disable a recording feature (550). The server 136 may generate the instruction 152 to disable the recording feature of the second computing device 108 based on determining that the second computing device 108 is located in the area specified in the request 124. In some implementations, the server 136 may also determine that the second computing device 108 includes a privacy management client 154 that is configured to receive and process the instruction 152. In some implementations, the instruction 152 may include the permissions 120 of the first computing device 104. In some implementations, the server 136 may store permission data for the first computing device 104 and the second computing device 108. In this case, the server 136 may determine that the permissions of the first computing device 104 are higher than the permissions of the second computing device 108. Based on this permission comparison, the server 136 may generate and output the instruction 152.

The server 136 receives, from the second computing device 108, data 162 confirming disabling of the recording feature (560). Based on the second computing device 108 processing the instruction 152, the second computing device 108 generates the data 162 confirming that the recording feature of the second computing device 108 is disabled. The second computing device 108 may comply with the instruction 152 based on the permissions 120 being higher than the permissions 156. In instances where the instruction 152 includes a time period to disable the recording feature and/or a location where to disable the recording feature, the data 162 may confirm that the recording feature of the second computing device 108 will be disabled while the second computing device 108 is located in the specified area and during the specified time period.

The server 136 provides, for output to the first computing device 104, data 182 confirming disabling of the recording feature of the second computing device 108 (570). The data 182 may include a summary of the actions performed by the server 136 and/or the second computing device 108. The data 182 may indicate the time period that recording feature will remain disabled and/or the location of the second computing device 108 where the recording feature will remain disabled. In some implementations, the server 136 may update the data 182 based on the second computing device 108 leaving the specified area. The update may indicate that the server 136 is no longer monitoring and/or managing the recording feature of the second computing device 108.

Figure 6:
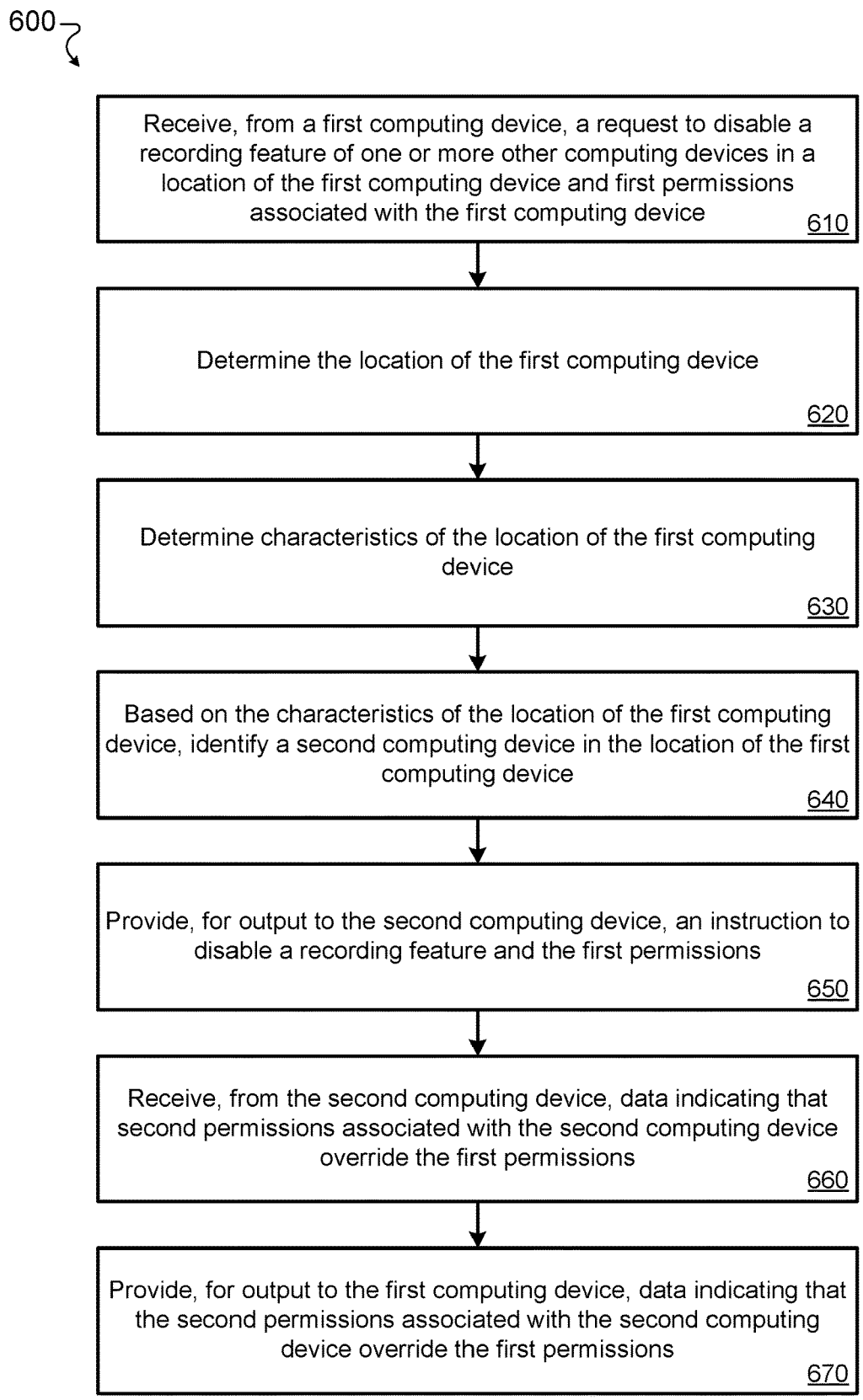
FIG. 6 is a flowchart of an example process for comparing permissions between two computing devices and adjusting a recording function of one of the computing devices.

FIG. 6 is a flowchart of an example process 600 for comparing permissions between two computing devices 104 and 112 and adjusting a recording function of one of the computing devices. In general, the process 600 receives a request to disable the recording function of computing devices located in a particular location. The process 600 identifies a computing device in the particular location and transmits an instruction to disable the recording function. Based on the permissions of the two computing devices 104 and 112, the computing device 112 does not comply with the instruction. The process 600 will be described as being performed by the server 136 of FIG. 1 and will include references to other components in FIG. 1. The process 600 may also be performed by the server 200 of FIG. 2.

The server 136 receives, from a first computing device 104, a request 124 to disable a recording feature of one or more other computing devices in a location 180 of the first computing device 104 and first permissions 120 associated with the first computing device 104 (610). The request 124 may include information related to the location 180. For example, the location 180 may be the area within a threshold distance of the first computing device 104. The location 180 may be the room where the computing device 104 is located. The request 124 may include a time period for disabling the recording feature of the one or more other computing devices. The server 136 may receive the request 124 using a privacy management application 126. The request 124 includes the first permissions 120 that indicate a permission level of the user 102. The first permissions 120 may be based on the position of the user 102 in the employer of the user 102. The employer may manage the first computing device 104 and assign each employee a permission level based on the position of the employee.

The server 136 determines the location of the first computing device 104 (620). The server 136 may include a mobility manager 130. The mobility manager 130 may access data indicating the location of the first computing device 104. The server 136 determines characteristics of the location of the first computing device 104 (630). The server 136 may determine that the location of the first computing device 104 is in a building. The server 136 may determine the characteristics of the building such as the layout of the building and the room where the first computing device 104 is located.

Based on the characteristics of the location of the first computing device 104, the server 136 identifies a second computing device 112 in the location of the first computing device 104 (640). The characteristics of the location of the first computing device 104 may assist the server 136 in identifying an area to search for the one or more other computing devices. The area may be defined by the walls of a room or a distance from the first computing device 104. The mobility manger 130 may determine that the second computing device 112 is located in the area.

The server 136 provides, for output to the second computing device 112, an instruction 164 to disable a recording feature and the first permissions 120 (650). The server 136 may generate the instruction 164 to disable the recording feature of the second computing device 112 based on determining that the second computing device 112 is located in the area specified in the request 124. In some implementations, the server 136 may also determine that the second computing device 112 includes a privacy management client 166 that is configured to receive and process the instruction 164. The instruction 164 may include the first permissions 120 of the first computing device 104. In some implementations, the server 136 may store permission data for the first computing device 104 and the second computing device 112. In this case, the server 136 may determine that the permissions of the first computing device 104 are lower than the permissions 172 of the second computing device 112. Based on this permission comparison, the server 136 may bypass generating and outputting the instruction 164. In this case, the server 136 may proceed with outputting data 182 to the first computing device 104.

The server 136 receives, from the second computing device 112, data 174 indicating that second permissions 172 associated with the second computing device 112 override the first permissions 120 (660). The second computing device 112 may receive the request 164 and compare the second permissions 172 to the first permissions 120 included in the request 164. The second computing device 112 may determine that the second permissions 172 are higher than the first permissions 120. Based on the second permissions 172 being higher than the first permissions 120, the second computing device 112 may not comply with the request 164. The second computing device 112 generates the data 174 indicating that the second permissions 172 override the first permissions 120. The data 174 may indicate that the second computing device 112 did not adjust the recording features of the second computing device 112. In some implementations the user 110 may comply with the request 164. In this case, the data 174 may indicate that the second computing device 112 adjusted the recording features of the second computing device 112 and that the second permissions 172 override the first permissions 120.

The server 136 provides, for output to the first computing device 104, data 182 indicating that the second permissions 172 associated with the second computing device 112 override the first permissions 120 (670). The data 182 may include a summary of the actions performed by the server 136 and/or the second computing device 112. The data 182 may indicate that the server 136 was unable to adjust the recording features of the second computing device 112. The data 182 may indicate that the second permissions 172 of the second computing device 112 override the first permissions 120 of the first computing device 104. In some implementations, the data 182 may include the location of the second computing device 112. If the second computing device 112 leaves the location 180 during the time period specified in the request 124, then the server 136 may provide updated data 182 indicating that the second computing device 112 is no longer in the location 180. If the user 110 complies with the request 164, then the data 182 may indicate that compliance.

Figure 7:
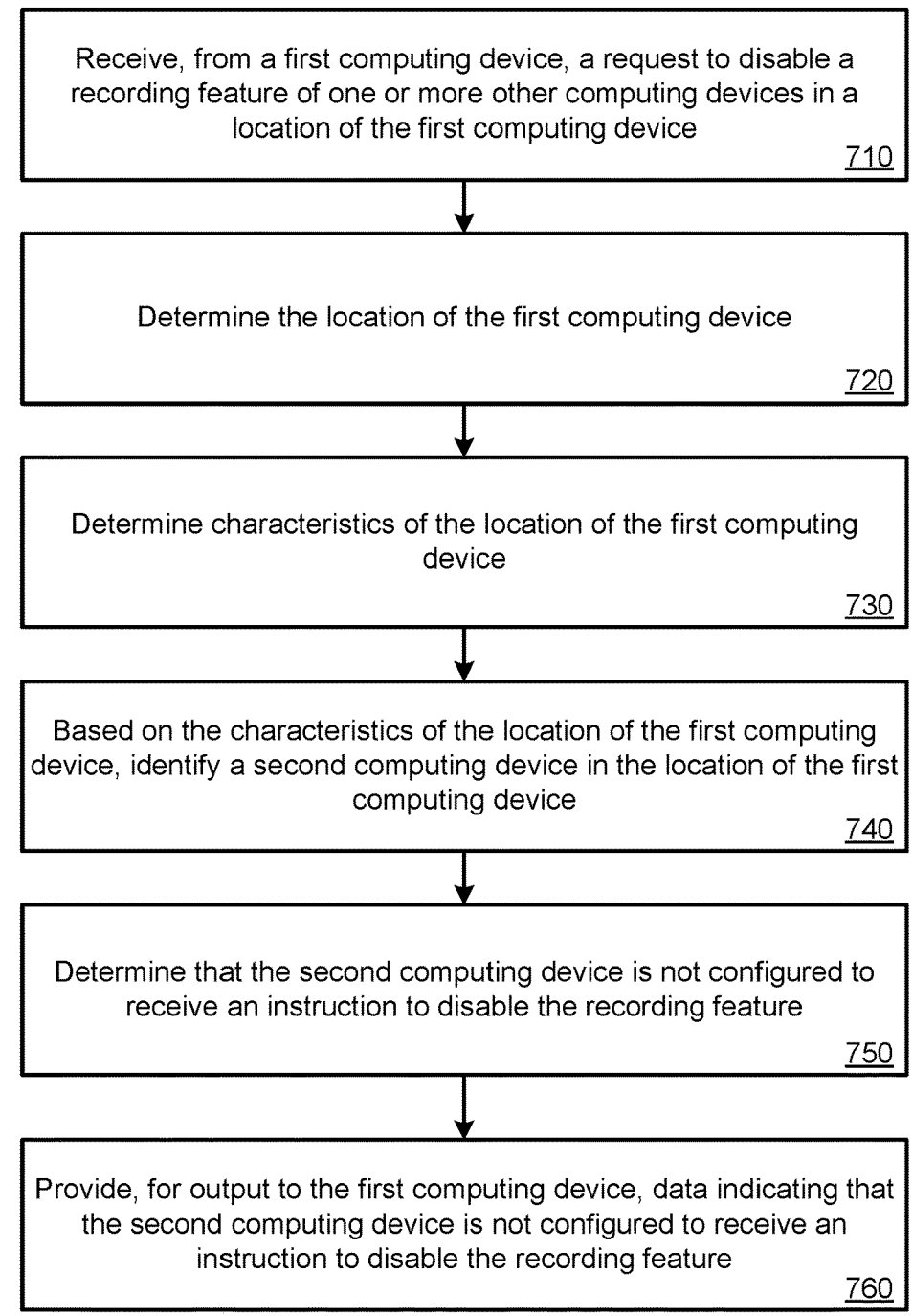
FIG. 7 is a flowchart of an example process for determining that a computing device in a particular location is not configured to receive an instruction to adjust the recording feature.

FIG. 7 is a flowchart of an example process 700 for determining that a computing device 114 in a particular location is not configured to receive an instruction to adjust the recording feature. In general, the process 700 receives a request to disable the recording function of computing devices located in a particular location. The process 700 identifies a computing device 114 in the particular location and determines that the computing device 114 is not configured to receive an instruction to disable the recording function. The process 700 will be described as being performed by the server 136 of FIG. 1 and will include references to other components in FIG. 1. The process 700 may also be performed by the server 200 of FIG. 2.

The server 136 receives, from a first computing device 104, a request 124 to disable a recording feature of one or more other computing devices in a location 180 of the first computing device 104 (710). The request 124 may include information related to the location 180. For example, the location 180 may be the area within a threshold distance of the first computing device 104. The location 180 may be the room where the computing device 104 is located. The request 124 may include a time period for disabling the recording feature of the one or more other computing devices. The server 136 may receive the request 124 using a privacy management application 126.

The server 136 determines the location of the first computing device 104 (720). The server 136 may include a mobility manager 130. The mobility manager 130 may access data indicating the location of the first computing device 104. The server 136 determines characteristics of the location of the first computing device 104 (730). The server 136 may determine that the location of the first computing device 104 is in a building. The server 136 may determine the characteristics of the building such as the layout of the building and the room where the first computing device 104 is located.

Based on the characteristics of the location of the first computing device 104, the server 136 identifies a second computing device 114 in the location of the first computing device 104 (740). The characteristics of the location of the first computing device 104 may assist the server 136 in identifying an area to search for the one or more other computing devices. The area may be defined by the walls of a room or a distance from the first computing device 104. The mobility manger 130 may determine that the second computing device 114 is located in the area.

The server 136 determines that the second computing device 114 is not configured to receive an instruction to disable the recording feature (750). In order to provide an instruction to disable the recording feature of the second computing device 114, the second computing device 114 should include a privacy management client. If the second computing device 114 does not include a privacy management client, then the server 136 may be unable to provide an instruction to disable the recording feature. The second computing device 114 may not include a privacy management client because the second computing device 114 may not be managed by an employer of the user 102. In other instances, the second computing device 114 may not include a privacy management client because the employer of the user 102 has not yet installed the privacy management client and/or the user 116 has not complied with requests to install the privacy management client.

The server 136 provides, for output to the first computing device 104, data 182 indicating that the second computing device 114 is not configured to receive an instruction to disable the recording feature (760). The data 182 may indicate that the second computing device 114 does not include a privacy management client. The data 182 may also indicate the location of the second computing device 114. If the second computing device 114 leaves the location 180 during the time period specified in the request 124, then the server 136 may update the data 182 to indicate that the second computing device 114 is no longer in the location 180.

FIG. 8 is a flowchart of an example process 800 for adjusting a recording function of a computing device 108 during a voice call. In general, the process 800 involves the computing device 104 and the computing device 108, which are engaged in a voice call or video chat. The process 800 receives a request from the user of the computing device 104 to disable the recording function of the computing device 108 and transmits a request to the computing device 108 to disable the recording function. The process 800 will be described as being performed by the computing device 104 of FIG. 1 and will include references to other components in FIG. 1. The process 800 may also be performed by the computing device 300 of FIG. 3.

The server 136 receives, from a first computing device 104 that is communicating with a second computing device 108, a request to disable a recording feature of the second computing device 108 (810). The user 102 of the first computing device 104 may be engaged in a voice call or video chat with the user 106 of the second computing device 108. The user 102 may wish to discuss sensitive topics and would like to ensure that the user 106 does not record them. In this case, the user 102 may input a request to the first computing device 104 to disable the recording features of the second computing device 108. In some instances, the user 102 may notify, through talking or another indicator, the user 106 that the user 102 would like the discussion to be secure.

The first computing device 104 may include a privacy management client 122 that is configured to generate the request to disable the recording feature of the second computing device 108. The request may include data identifying the user 102, the permissions 120, a time period to disable the recording feature (e.g., five minutes or for the remainder of the voice call or video chat), data indicating to disable the recording feature of the other participating computing device, and/or any other similar instructions. The privacy management application 126 receives the request from the privacy management client 122.

The server 136 determines that the second computing device 108 is configured to receive the request to disable the recording feature (820). The second computing device 108 may be configured to receive the request to disable the recording feature because the second computing device 108 includes the privacy management client 154. In some implementations, the server 136 may determine that the permissions 120 are higher than the permissions 156. The server 136 may make this determination in the case where the permissions are accessible to the server 136 and/or stored on the server 136.

The server 136 provides, for output to the second computing device 108, an instruction to disable the recording feature (830). The privacy management client 154 may receive the instruction to disable the recording feature. In the case where the instruction includes the permissions 120, the privacy management client 154 may compare the permissions 120 to the permissions 156. If the permissions 120 are higher or the same as the permissions 156, then the privacy management client 154 may implement the instruction to disable the recording feature. If the permissions 120 are lower than the permissions 156, then the privacy management client 154 may not implement the instruction. The privacy management client 154 may output data indicating whether the privacy management client 154 complied with the instruction. If the privacy management client 154 did not comply with the instruction, then the privacy management client 154 may include a reason. In some implementations, if the privacy management client 154 does not implement the instruction, then the privacy management client 154 may generate a graphical interface that allows the user 106 to select the option of complying with the instruction. In some implementations, if the privacy management client 154 implements the instruction, then the privacy management client 154 may generate a graphical interface indicating that the recording function of the computing device 108 have been disabled.

In some implementations, the user 102 may wish to prevent the user 106 from recording the conversation using a different computing device than computing device 108. In this case, the request from the user 102 may indicate to disable the recording function of computing devices in the same room and/or within a threshold distance of the computing device 108. The privacy management application 126 may request the location of the computing device 108 and identify those computing devices that are in the same room and/or within the threshold distance of the computing device 108 using techniques similar to those described above. The privacy management application 126 may transmit a request to those computing devices to disable their recording function.

Figure 9:
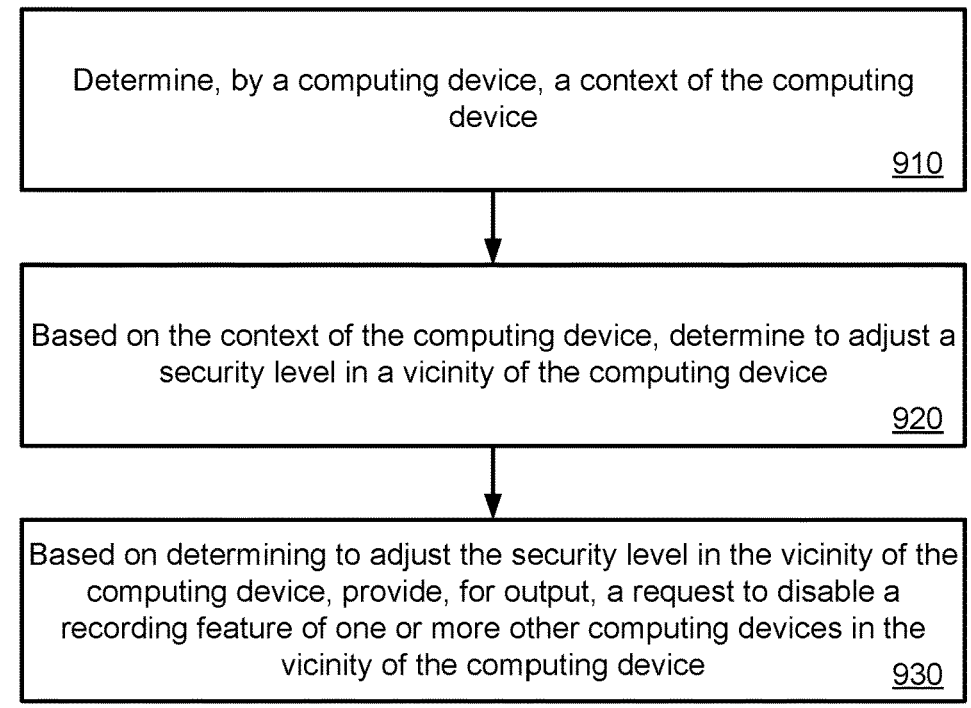
FIG. 9 is a flowchart of an example process for adjusting recording functions of computing devices based on context.

FIG. 9 is a flowchart of an example process 900 for adjusting recording functions of computing devices 108, 112, and 114 based on context. In general, the process 900 determines the context of a computing device 104. Based on the context of the computing device 104, the process 900 determines to adjust the security level around the computing device 104. The process 900 transmits a request to disable the recording functions of the computing devices 108, 112, and 114. The process 900 will be described as being performed by the computing device 104 of FIG. 1 and will include references to other components in FIG. 1. The process 900 may also be performed by the computing device 300 of FIG. 3.

The computing device 104 determines a context of the computing device 104 (910). The context of the computing device 104 may include the location of the computing device 104, the type of the computing device 104, audio detected by the computing device 104, a transcription of the detected audio, the date and time, whether the computing device 104 is indoors or outdoors, the permissions 120, the nearby computing devices, and/or any other similar data. The nearby computing devices may be computing devices with which the computing device 104 is able to communicate with using short range radio or another detection technique.

Based on the context of the computing device 104, the computing device 104 determines to adjust a security level in a vicinity of the computing device 104 (920). Adjusting the security level may include disabling the recording functions of the computing devices in the vicinity of the computing device. The computing device 104 may include privacy models and/or privacy rules. The privacy models may be trained using machine learning and historical data that includes previous context data from previous instances where the computing device 104 and other computing devices have attempted to disabling the recording functions of the computing devices in the vicinity. The historical data may also include previous context data from previous instance where the computing device 104 and other computing devices did not attempt to disable the recording functions of the computing devices in the vicinity. The privacy rules may be generated by identifying patterns in the historical data. For example, if a transcription of the detected audio includes the words, "do not record," and within two minutes, the computing device receives an instruction from the user to disable the recording function of nearby devices, then a privacy rule may indicate to disable the recording function of nearby devices in response to detecting the words, "do not record."

The computing device 104 may provide the context data as an input to the privacy models and/or privacy rules. The privacy models and/or privacy rules may output data indicating whether to adjust the security level in the vicinity of the computing device. If the privacy models and/or privacy rules indicate to adjust the security level in the vicinity of the computing device, then the computing device 104 may automatically attempt to disable the recording functions of nearby computing devices. If the privacy models and/or privacy rules indicate not to adjust the security level in the vicinity of the computing device, then the computing device 104 may take no action with regard to adjusting the security level.

Based on determining to adjust the security level in the vicinity of the computing device 104, the computing device 104 provides, for output, a request to disable a recording feature of one or more other computing devices in the vicinity of the computing device 104 (930). The computing device 104 may output the request without receiving an express input from the user 102 to disable the recording feature of one or more other computing devices in the vicinity of the computing device 104.

In some implementations, the computing device 104 may continue to detect an updated context and update the context data. The computing device 104 may provide the updated context data to the privacy models and/or privacy rules, and the privacy models and/or privacy rules may update their previous outputs. Depending if the outputs of the privacy models and/or privacy rules changes, the computing device 104 may update the request to disable the recording feature of one or more other computing devices in the vicinity of the computing device 104. By continuously detecting the context data and providing the context data to the privacy models and/or privacy rules, the computing device 104 may be able to automatically detect situations where the security level in the vicinity of the computing device 104 should be adjusted. The computing device 104 may also be able to automatically detect when the security level in the vicinity of the computing device 104 should return to the previous level.

Although a few implementations have been described in detail above, other modifications are possible. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method, comprising:
    receiving, by a server and from a first computing device, a request to disable an audio, video, or image capture feature of one or more other computing devices in a vicinity of the first computing device;
    based on receiving the request to disable the audio, video, or image capture feature of the one or more other computing devices:
        determining, by the server, a location of the first computing device; and
        identifying, by the server, a second computing device in the location of the first computing device;
    determining, by the server, first permissions associated with the first computing device;
    determining, by the server, second permissions associated with the second computing device;
    comparing, by the server, the first permissions and the second permissions; and
    based on comparing the first permissions and the second permissions, providing, for output by the server and to the second computing device, an instruction to disable the audio, video, or image capture feature.

2. The method of claim 1, comprising:
    determining, by the server, that the second computing device is configured to receive and implement the instruction to disable the audio, video, or image capture feature,
    wherein providing the instruction to disable the audio, video, or image capture feature is based on determining that the second computing device is configured to receive and implement the instruction to disable the audio, video, or image capture feature.

3. The method of claim 1, wherein identifying the second computing device in the location of the first computing device comprises:
    determining that the second computing device is within a threshold distance of the first computing device.

4. The method of claim 1, wherein identifying the second computing device in the location of the first computing device comprises:
    determining that the second computing device is located in a room where the first computing device is located.

5. The method of claim 1, comprising:
    determining, by the server, that the second computing device is no longer in the location of the first computing device; and
    based on determining that the second computing device is no longer in the location of the first computing device, providing, for output by the server and to the second computing device, an additional instruction to enable the audio, video, or image capture feature.

6. The method of claim 1, wherein providing, for output to the second computing device, the instruction to disable the audio, video, or image capture feature comprises providing, for output to the second computing device, the instruction to disable a camera and a microphone of the second computing device.

7. The method of claim 1, comprising:
based on receiving the request to disable the audio, video, or image capture feature of the one or more other computing devices, identifying, by the server, a third computing device in the location of the first computing device;
determining, by the server, that the third computing device is not configured to receive the instruction to disable the audio, video, or image capture feature; and
providing, for output by the server and to the first computing device, data indicating that the third computing device is in the location of the first computing device and is not configured to receive the instruction to disable the audio, video, or image capture feature.

8. The method of claim 1, comprising:
based on receiving the request to disable the audio, video, or image capture feature of the one or more other computing devices, identifying, by the server, a third computing device in the location of the first computing device;
determining, by the server that first permissions associated with the third computing device override second permissions associated with the first computing device; and
providing, for output by the server and to the first computing device, data indicating that the third computing device is in the location of the first computing device and the first permissions associated with the third computing device override the second permissions associated with the first computing device.

9. A system, comprising:
one or more processors; and
memory including a plurality of computer-executable components that are executable by the one or more processors to perform a plurality of actions, the plurality of actions comprising:
  receiving, by a server and from a first computing device, a request to disable an audio, video, or image capture feature of one or more other computing devices in a vicinity of the first computing device;
  based on receiving the request to disable the audio, video, or image capture feature of the one or more other computing devices:
    determining, by the server, a location of the first computing device; and
    identifying, by the server, a second computing device in the location of the first computing device;
  determining, by the server, first permissions associated with the first computing device;
  determining, by the server, second permissions associated with the second computing device;
  comparing, by the server, the first permissions and the second permissions; and
  based on comparing the first permissions and the second permissions, providing, for output by the server and to the second computing device, an instruction to disable the audio, video, or image capture feature.

10. The system of claim 9, wherein the actions comprise:
determining, by the server, that the second computing device is configured to receive and implement the instruction to disable the audio, video, or image capture feature,
wherein providing the instruction to disable the audio, video, or image capture feature is based on determining that the second computing device is configured to receive and implement the instruction to disable the audio, video, or image capture feature.

11. The system of claim 9, wherein identifying the second computing device in the location of the first computing device comprises:
determining that the second computing device is within a threshold distance of the first computing device.

12. The system of claim 9, wherein identifying the second computing device in the location of the first computing device comprises:
determining that the second computing device is located in a room where the first computing device is located.

13. The system of claim 9, wherein the actions comprise:
determining, by the server, that the second computing device is no longer in the location of the first computing device; and
based on determining that the second computing device is no longer in the location of the first computing device, providing, for output by the server and to the second computing device, an additional instruction to enable the audio, video, or image capture feature.

14. The system of claim 9, wherein providing, for output to the second computing device, the instruction to disable the audio, video, or image capture feature comprises providing, for output to the second computing device, the instruction to disable a camera and a microphone of the second computing device.

15. The system of claim 9, wherein the actions comprise:
based on receiving the request to disable the audio, video, or image capture feature of the one or more other computing devices, identifying, by the server, a third computing device in the location of the first computing device;
determining, by the server, that the third computing device is not configured to receive the instruction to disable the audio, video, or image capture feature; and
providing, for output by the server and to the first computing device, data indicating that the third computing device is in the location of the first computing device and is not configured to receive the instruction to disable the audio, video, or image capture feature.

16. The system of claim 9, wherein the actions comprise:
based on receiving the request to disable the audio, video, or image capture feature of the one or more other computing devices, identifying, by the server, a third computing device in the location of the first computing device;
determining, by the server that first permissions associated with the third computing device override second permissions associated with the first computing device; and
providing, for output by the server and to the first computing device, data indicating that the third computing device is in the location of the first computing device and the first permissions associated with the third computing device override the second permissions associated with the first computing device.

17. One or more non-transitory computer-readable media of a computing device storing computer-executable instructions that upon execution cause one or more processors to perform acts comprising:
receiving, by a server and from a first computing device, a request to disable an audio, video, or image capture feature of one or more other computing devices in a vicinity of the first computing device;

based on receiving the request to disable the audio, video, or image capture feature of the one or more other computing devices:

determining, by the server, a location of the first computing device; and identifying, by the server, a second computing device in the location of the first computing device;

determining, by the server, first permissions associated with the first computing device;

determining, by the server, second permissions associated with the second computing device;

comparing, by the server, the first permissions and the second permissions; and based on comparing the first permissions and the second permissions, providing, for output by the server and to the second computing device, an instruction to disable the audio, video, or image capture feature.

18. The media of claim 17, wherein the acts comprise:

determining, by the server, that the second computing device is configured to receive and implement the instruction to disable the audio, video, or image capture feature, wherein providing the instruction to disable the audio, video, or image capture feature is based on determining that the second computing device is configured to receive and implement the instruction to disable the audio, video, or image capture feature.

19. The media of claim 17, wherein identifying the second computing device in the location of the first computing device comprises:

determining that the second computing device is within a threshold distance of the first computing device.

20. The media of claim 17, wherein identifying the second computing device in the location of the first computing device comprises:

determining that the second computing device is located in a room where the first computing device is located.

* * * * *